(12) United States Patent
Tuffile et al.

(10) Patent No.: US 10,654,100 B2
(45) Date of Patent: May 19, 2020

(54) LAYERED CONSTRUCTION OF METALLIC MATERIALS

(71) Applicant: The NanoSteel Company, Inc., Providence, RI (US)

(72) Inventors: Charles D. Tuffile, Dighton, MA (US); Harald Lemke, Northport, NY (US)

(73) Assignee: The NanoSteel Company, Inc., Providence, RI (US)

( * ) Notice: Subject to any disclaimer, the term of this patent is extended or adjusted under 35 U.S.C. 154(b) by 726 days.

(21) Appl. No.: 14/715,164

(22) Filed: May 18, 2015

(65) Prior Publication Data

US 2015/0328680 A1 Nov. 19, 2015

Related U.S. Application Data

(60) Provisional application No. 61/994,758, filed on May 16, 2014.

(51) Int. Cl.
| | |
|---|---|
| *C22C 38/38* | (2006.01) |
| *C22C 38/36* | (2006.01) |
| *C22C 38/34* | (2006.01) |
| *C22C 38/32* | (2006.01) |
| *C22C 38/26* | (2006.01) |
| *C22C 38/22* | (2006.01) |

(Continued)

(52) U.S. Cl.
CPC .............. *B22D 19/00* (2013.01); *B22D 25/00* (2013.01); *B22F 3/1055* (2013.01); *B22F 7/02* (2013.01); *B32B 15/01* (2013.01); *C22C 1/02* (2013.01); *C22C 38/02* (2013.01); *C22C 38/04* (2013.01); *C22C 38/22* (2013.01); *C22C 38/26* (2013.01); *C22C 38/32* (2013.01); *C22C 38/34* (2013.01); *C22C 38/36* (2013.01); *C22C 38/38* (2013.01); *B22F 2007/042* (2013.01); *B22F 2998/10* (2013.01); *B22F 2999/00* (2013.01); *B33Y 10/00* (2014.12)

(58) Field of Classification Search
None
See application file for complete search history.

(56) References Cited

U.S. PATENT DOCUMENTS

| | | |
|---|---|---|
| 6,767,419 B1 | 7/2004 | Branagan |
| 2003/0051781 A1 | 3/2003 | Branagan |

(Continued)

FOREIGN PATENT DOCUMENTS

| | | | |
|---|---|---|---|
| CN | 101358344 A | * | 2/2009 |
| CN | 102848102 A | * | 1/2013 |

(Continued)

OTHER PUBLICATIONS

Chokethawai et al. Journal of Alloys and Compounds 480 (2009) 351-359. (Year: 2009).*

(Continued)

*Primary Examiner* — Paul A Wartalowicz
*Assistant Examiner* — Stephani Hill
(74) *Attorney, Agent, or Firm* — Grossman, Tucker, Perreault & Pfleger, PLLC

(57) ABSTRACT

The present disclosure is directed at alloys and method for layer-by-layer deposition of metallic alloys on a substrate. The resulting deposition provides for relatively high hardness metallic parts with associated wear resistance. Applications for the metallic parts include pumps, valves and/or bearings.

17 Claims, 6 Drawing Sheets

(51) Int. Cl.
*C22C 38/04* (2006.01)
*C22C 38/02* (2006.01)
*B32B 15/01* (2006.01)
*B22F 3/105* (2006.01)
*B22F 7/02* (2006.01)
*B33Y 10/00* (2015.01)
*B22F 7/04* (2006.01)
*B22D 19/00* (2006.01)
*B22D 25/00* (2006.01)
*C22C 1/02* (2006.01)

(56) References Cited

U.S. PATENT DOCUMENTS

| | | | |
|---|---|---|---|
| 2005/0164016 A1* | 7/2005 | Branagan | B81L 37/0029 428/446 |
| 2007/0281176 A1 | 12/2007 | Palumbo et al. | |
| 2008/0141938 A1 | 6/2008 | Chandran et al. | |
| 2008/0185188 A1* | 8/2008 | Blue | C23C 24/08 175/374 |
| 2010/0304179 A1 | 12/2010 | Facchini et al. | |
| 2011/0031222 A1 | 2/2011 | Branagan et al. | |
| 2011/0241947 A1* | 10/2011 | Scott | B22F 3/1055 343/700 MS |
| 2012/0222789 A1 | 9/2012 | Tuffile et al. | |
| 2013/0224516 A1* | 8/2013 | Kusinski | F16L 58/08 428/681 |
| 2013/0309121 A1 | 11/2013 | Prest et al. | |

FOREIGN PATENT DOCUMENTS

| | | |
|---|---|---|
| EP | 1992709 | 11/2008 |
| JP | 2005-524776 | 8/2005 |
| WO | 2002044437 | 6/2002 |
| WO | WO03106718 | 12/2003 |
| WO | WO-2005073425 A1 * | 8/2005 ............... C23C 4/00 |
| WO | 2010027317 | 3/2010 |
| WO | 2011053928 | 5/2011 |

OTHER PUBLICATIONS

Hanson et al. Journal of Thermal Spray Technology. vol. 11 (1) Mar. 2002, 75-85. (Year: 2002).*
CN 101358344 machine translation (Year: 2009).*
WO2005/073425 machine translation (Year: 2005).*
Napadlek et al. "Study of selected properties of nanostructured hardfacings prepared by laser technique which are intended for machine parts with increased wear resistance under friction conditions." Tribologia (2010), 41(5), 21-36. STN English Abstract. (Year: 2010).*
Loeber et al. "Comparison of selective laser and electron beam melted titanium aluminides" Solid Freeform Fabrication Symposium. Jul. 2011. 547-556. (Year: 2011).*
Napadlek et al. "Study of selected properties of nanostructured hardfacings prepared by laser technique which are intended for machine parts with increased wear resistance under friction conditions." Tribologia (2010), 41(5), 21-36. (Year: 2010).*
Written English Translation of Napadlek et al. "Study of selected properties of nanostructured hardfacings prepared by laser technique which are intended for machine parts with increased wear resistance under friction conditions." Tribologia (2010), 41(5), 21-36. (Year: 2010).*
CN 102848102 machine translation (Year: 2013).*
B. Zheng; Y. Zhou; J.E. Smugeresky; E.J. Lavernia. "Processing and behavior of Fe-based metallic glass components via laser-engineering net shaping". Metallurgical and Materials Transactions, May 2009, 40A, 5, p. 1235-1245. (Year: 2009).*
International Search Report dated Aug. 10, 2015 issued in related International Patent Application No. PCT/US2015/031398.
European Search Report dated Nov. 14, 2017 issued in related European Patent Application No. 15792187.5.
Himanshu Sahasrabudhe et al: "Laser Processing of Fe-Based Bulk Amorphous Alloy Coatings on Titanium," Metallurgical and Materials Transactions A: Physical Metallurgy & Materials Science., vol. 44, No. 11, Nov. 1, 2013 (Nov. 1, 2013), pp. 4914-4926, XP055421012, US ISSN: 1073-5623, DOI: 10. 1007/s11661-013-1846-0.
Jendrzewski R et al: "Temperature and Stress During Laser Cladding of Double-Layer Coatings," Surface and coatings Technology, vol. 201, No. 6, Aug. 17, 2006 (Aug. 17, 2006), pp. 3328-3334, XP029041185, ISSN: 0257-8972, DOI: 10. 1016/J. Surcoat. 2006. 07.065.
Office Action from related Japanese Application No. 2016-568008 dated Feb. 25, 2019. English translation provided.
Office Action from related Chinese Application No. 201580033118.7 dated Jan. 30, 2019. English translation provided.
Office Action from related European Application No. 15792187.5-1103 dated Sep. 4, 2019.
Ye Xiaoyanget al: "Synthesis and characterization of Fe-based amorphous composite by laser direct deposition", Surface and Coatings Technology, Elsevier BV, Amsterdam, NL, vol. 239, Nov. 15, 2013, pp. 34-40.
Simon Pauly et al: "Processing metallic glasses by selective laser melting",Materials Today, vol. 16, Nos. 1/2, Jan./Feb. 2013, pp. 37-41.

* cited by examiner

LAYERED CONSTRUCTION OF METALLIC MATERIALS

CROSS-REFERENCE TO RELATED APPLICATIONS

This application claims the benefit of U.S. Provisional Patent Application Ser. No. 61/994,758, filed on May 16, 2014, which is fully incorporated herein by reference.

FIELD OF THE INVENTION

The present invention relates to alloys and methods for the preparation of free-standing metallic materials in a layerwise manner.

BACKGROUND

Ferrous metals are used as coatings in many applications such as drill pipe hardbanding, mining truck bed liners, and boiler tubes, where the coatings provide wear and abrasion resistance to relatively less wear resistant components. These coatings can be applied to substrates via various techniques such as HVOF or twin-wire arc thermal spray, and PTAW or GMAW weld overlay.

Wear resistant ferrous metal coatings are generally characterized by a relatively low cost and a relatively high surface hardness which enables the wear resistance of the materials and protects the underlying substrate. The materials used as wear resistant coatings were designed to adhere to a substrate and provide the desired surface performance, and as such are largely dependent on the substrate for non-surface properties such as strength and toughness. Examples of ferrous metal coatings used for wear resistance include chrome carbides, complex carbides, titanium carbides, vanadium carbides, and tool steels.

Layerwise construction can be understood herein as a process where layers of a material are built up, or laid down, layer by layer to fabricate a component. Examples of layerwise construction include powder bed fusion with a laser (PBF-L) or electron-beam (PBF-E) energy source, directed energy deposition (DED), binder jetting (BJ), sheet lamination, material extrusion, material jetting, and vat photopolymerization. The primary layerwise construction processes used with metal include PBF-L, PBF-E, DED, and BJ.

Layerwise construction processes have excellent capability to construct components from a variety of ductile metals including stainless steel alloys, aluminum alloys, titanium alloys, nickel-based alloys, and cobalt chrome alloys. In liquid-phase layerwise construction processes for metals such as PBF-L, PBF-E, and DED, the construction material transitions from a solid phase to a liquid phase (melting), then back to a solid phase (solidification). The energy source used for melting can be focused to a relatively small area of the material surface to be melted and as such can control the volume of material being melted to a relatively small volume. The small molten volume, being in contact with a large solid volume, has the capability to solidify in a relatively rapid manner. This rapid solidification is responsible for grain size refinement and an increase in mechanical properties when compared to wrought metal properties.

While the mechanical properties of components constructed in this manner are generally relatively higher than wrought processes, none of the aforementioned materials possess the combination of relatively high hardness and wear resistance, and those with the highest hardness generally require heat treating processes such as quench and temper, or solutionizing and aging, to yield a relatively high hardness and wear resistance. Such additional step of heat treating typically results in increased yield loss and part distortion, which is undesirable. Table 1 lists the typical hardness of a variety of relatively high hardness metals produced via PBF-L in stress-relieved and heat treated conditions.

TABLE 1

| Material | Grade | Temper | Microhardness (HV) |
|---|---|---|---|
| Stainless Steel | 17-4PH | Stress-relieved | 288 |
| Stainless Steel | 17-4PH | H900 | 421 |
| Stainless Steel | 15-5PH | Stress-relieved | 315 |
| Stainless Steel | 15-5PH | H900 | 419 |
| Stainless Steel | 316L | Stress-relieved | 203 |
| Stainless Steel | 316L | 2000° F. for 2 hr | 171 |
| Steel | 18% Ni Maraging 300 | Stress-relieved | 340 |
| Steel | 18% Ni Maraging 300 | 915° F. for 6 hr | 545 |
| Steel | H13 | Stress-relieved | 613 |
| Steel | H13 | 1076° F. for 1 hr (x2) | 653 |
| Nickel-Based | Inconel 718 | Stress-relieved | 263 |
| Nickel-Based | Inconel 718 | AMS 5662 | 408 |
| Titanium | Ti6Al4V | Stress-relieved | 362 |
| Titanium | Ti6Al4V | 1725° F. for 45 min | 316 |

High hardness and wear resistance in components is desired for numerous applications to increase the durability (longevity) of the components in service. The present invention now identifies alloys and corresponding manufacturing procedures that provide for a layered metallic material, prepared via a layer-by-layer build-up, that indicates a unique combination of relatively high hardness and wear resistance. In addition, such properties can now be achieved by eliminating the use of the above referenced heat treating process applied to existing layer-by layer build-up of known metals. In addition, the properties herein do not require quenching and/or tempering.

SUMMARY

Layer-by-layer construction is applied to alloys to produce a relatively high hardness and wear resistant freestanding material. The alloys comprise ferrous alloy containing at least 50 at. % Fe and at least one element selected from the group consisting of Ti, Zr, Hf, V, Nb, Ta, Cr, Mo, W, Al, La, Ce, Pr, Nd, Sm, Eu, Gd, Tb, Dy, Ho, Er, Tm, Yb, and Lu; and at least one element selected from the group consisting of B, C, N, O, P, and S. The hardness values are in the range of 900-1800 HV and the wear resistance values are in the range of 6-53 $mm^3$ volume loss per ASTM G65-10 Procedure A, dated 2010. Such values are achieved without the need for post-treating of the layer-by-layer build up with heat followed by quenching and/or tempering. The layer-by-layer construction allows for the formation of metallic components that may be utilized in applications such as pumps, valves and bearings.

The present disclosure also more specifically relates to a method of layer-by-layer construction of a metallic part comprising:

supplying an alloy in particle form comprising Fe at a level of 59.0 wt. % to 78.0 wt. %, B at a level of 3.0 wt. % to 5.0 wt. %, Cr at a level of 14.0 wt. % to 20.0 wt. %, C at a level of 0.5 wt. % to 7.0 wt. %, optionally Mo at a level of up to 11.0 wt. %, optionally Mn at a level of up to 2.5 wt. %, optionally Nb at a level of up to 4.5 wt. %, optionally Si at a level of up to 2.0 wt. %, optionally W at a level of up to 7.0 wt. %;

supplying a substrate;

applying one or more layers of said alloy onto said substrate by melting said alloy into a molten state and cooling and forming a solidified layer wherein each of said solid layers has a thickness as formed of 5.0 to 200.0 microns; and optionally removing said substrate to form a free-standing metallic part and wherein said one or more solid layers indicates a hardness in the range of 900-1800 HV.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
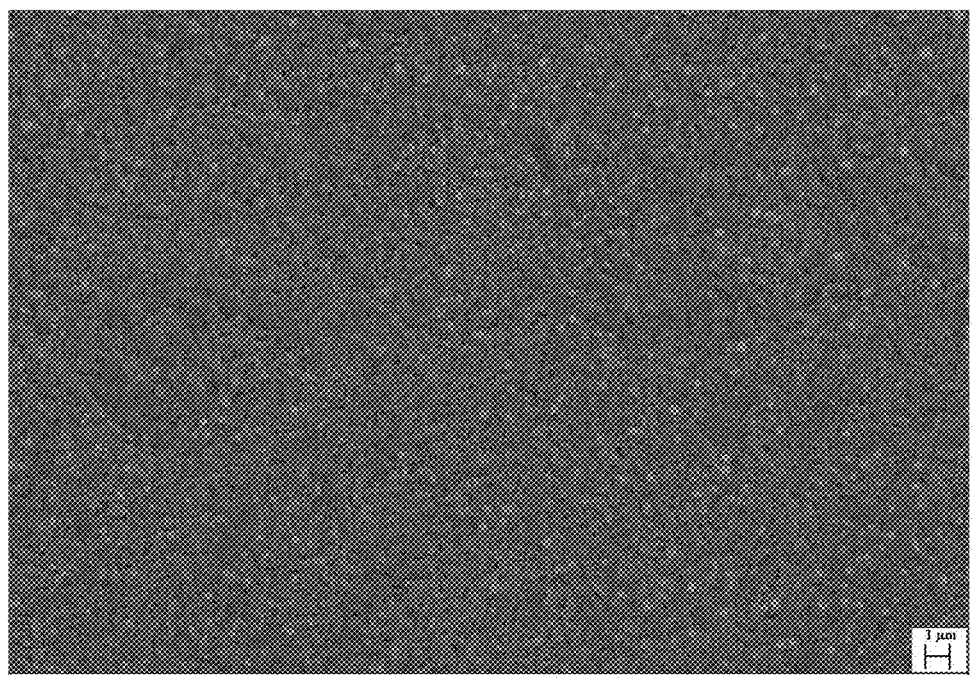
FIG. 1 is a SEM micrograph of ferrous alloy processed via PBF-L showing carbide and borocarbide phases present in Fe-rich matrix.

The present invention relates to a method of constructing free-standing and relatively hard and wear-resistant iron-based metallic materials, to provide a built metallic structure, via a layer-by-layer build-up of successive metal layers on an initial substrate. Layer-by-layer build up is reference to the general procedure of melting metallic alloys and cooling and solidifying to form a layer of material, which becomes an underlying solid layer for subsequent application of an additional molten alloy layer, again followed by cooling. The substrate may or may not be included in the built structure that is formed by the layer-by-layer procedure. Reference to a free-standing metallic material is therefore to be understood herein as that situation where the layer-by-layer build up, on a substrate, is employed to form a given built structure, which structure may then serve as a metallic part component in a variety of applications.

Suitable substrates for initiating the layer-by-layer build up may include austenitic, ferritic, and martentisic steels and may have thickness in the range of 3 mm-100 mm. As noted, the substrates typically are not included as part of the final structure and after building the structure the substrate and structure may be separated via a variety of techniques including electric-discharge machining (EDM) and mechanical sawing.

The layer-by-layer procedure herein contemplates a build-up of individual layers each having a thickness in the range of 5.0 microns to 200.0 microns. The layer-by-layer procedure may then provide for deposition with an overall thickness in the range of 5 microns to greater than 50.0 mm, and more typically greater than 250.0 mm. Accordingly, suitable range of thickness for the built-up layers is 5.0 microns and higher. More commonly, however, the thickness ranges are from 5.0 microns to 250.0 mm.

The relatively high hardness of the iron based alloys is contemplated to be the result of the relatively fine scale microstructures (grain size) and phases present in the iron-based alloy when processed in a liquid phase layerwise construction process. More specifically, the iron-based alloys herein are such that when formed into the liquid phase herein at elevated temperatures and allowed to cool and solidify and form a given layer, the microstructure preferably consists of homogeneously distributed carbide and borocarbide phases in an Fe-rich matrix, where the carbide and borocarbide phases range in size from about 10.0 nm-10,000 nm.

An exemplary ferrous alloy comprises at least 50% Fe and at least one element selected from the group consisting of Ti, Zr, Hf, V, Nb, Ta, Cr, Mo, W, Al, La, Ce, Pr, Nd, Sm, Eu, Gd, Tb, Dy, Ho, Er, Tm, Yb, and Lu; and at least one element selected from the group consisting of B, C, N, O, P, and S. In particular aspects of the present invention, the alloy will have a composition represented by the formula $Fe(100-x-y)M(x)B(y)$ (atomic percent) wherein M represents at least one element selected from Ti, Zr, Hf, V, Nb, Mo, Ta, Cr, W, and Mn, wherein $15 \geq x \geq 4$, wherein $25 \geq y \geq 2$, and wherein $35 \geq (x+y) \geq 7$. B is reference to boron. The alloy can further contain X (Si, Ge, P, Ga, etc.) and/or T (Au, Co, Ni, etc.).

Alloys of the present invention preferably comprise fewer than eleven elements, and can more preferably comprise fewer than seven elements. Additionally, the alloys can comprise fewer than five elements. Generally alloys of the present invention have from four to six elements in their compositions. Among such elements are iron, chromium, boron and/or phosphorous, and one or both of molybdenum and tungsten.

It is worth noting that the above alloys have a relatively high susceptibility to cracking and are typically employed as coatings that have a relatively high level of cracking. Accordingly, such alloys were not expected to be useful for layer-by-layer procedures as described herein, and unexpectedly provided layer-by-layer build up and metallic components with unexpected hardness and wear properties.

That is, when processed in liquid phase layerwise construction the ferrous alloys present various homogeneously distributed relatively small, hard carbide phases such as borocarbides, chromium carbides, molybdenum carbides, and niobium carbides, in an Fe-rich matrix, which provide the relatively high hardness in the ferrous alloy. The size of each phase is relatively small due to the rapid cooling of the process, and is preferably less than 10.0 microns, more preferably less than 5.0 microns, and most preferably less than 1.0 micron. Accordingly, borocarbide phases are to be present in the layerwise construction of the ferrous alloys herein such that they have a size range of 0.1 microns to 10.0 microns, more preferably 0.1 microns to 5.0 microns, most preferably 0.1 microns to 1.0 microns.

In connection with the above, phase sizes of the borocarbide phases as well as grain sizes may be readily determined by optical microscopy and/or scanning electron microscopy.

In addition, the relatively high cooling rate inherent in the PBF-L process produces, in the ferrous alloys, a microstructure characterized by relatively small grains, preferably below 10 micron, more preferably below 5 micron, and most preferably below 1 micron. Accordingly, the grains present in the layerwise construction herein are present such that they have a size range of 0.1 microns to 10 microns, more preferably 0.1 microns to 5 microns and most preferably 0.1 microns to 1.0 microns. The structure of the ferrous alloys produced in layerwise construction results in relatively high hardness, preferably in the range of 900-1800 HV, more preferably in the range of 950-1700 HV and most preferably in the range of 980-1600 HV.

Figure 2:
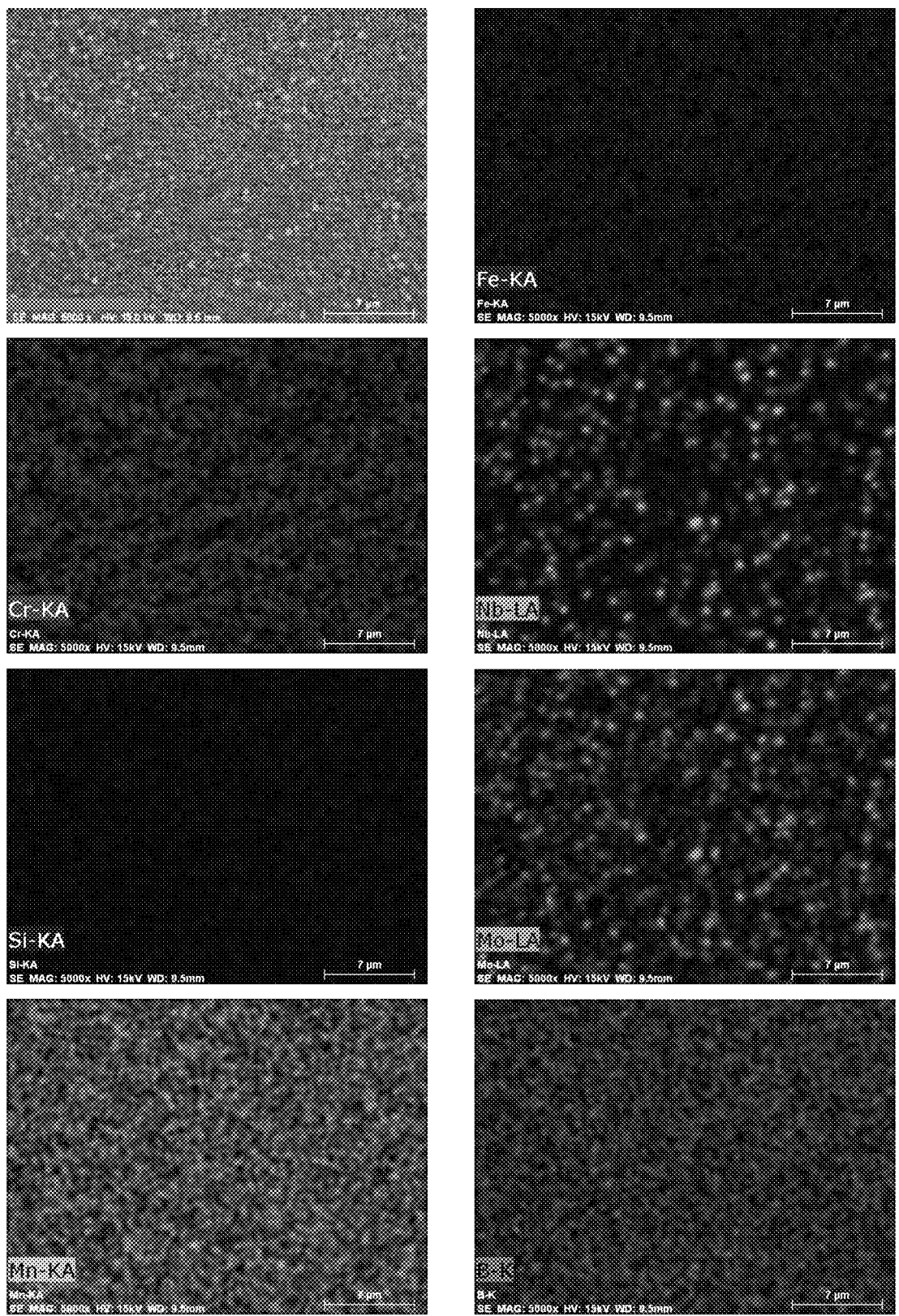
FIG. 2 contains an elemental map of Alloy 1 produced via PBF-L that shows the primary elements Fe, Cr, Nb, Si, Mo, Mn, and B contained within the various phases. The elemental map was generated via energy dispersive x-ray spectroscopy in a scanning electron microscope.

FIG. 1 shows a representative micrograph of a ferrous alloy (Alloy 1) with various carbide phases processed via PBF-L. FIG. 2 shows an elemental map of Alloy 1 produced via PBF-L that shows the primary elements Fe, Cr, Nb, Si, Mo, Mn, and B contained within the various phases. The elemental map was generated with energy-dispersive x-ray spectroscopy in a scanning electron microscope. Table 1 below sets out the compositions of Alloy 1 and Alloy 2.

TABLE 1

| Element | Alloy 2 Upper Wt. % | Alloy 2 Lower Wt. % | Alloy 1 Upper Wt. % | Alloy 1 Lower Wt. % |
| --- | --- | --- | --- | --- |
| Fe | 59.30 | 54.10 | 77.55 | 74.15 |
| B | 3.50 | 3.10 | 4.50 | 4.10 |
| Cr | 19.90 | 18.40 | 15.10 | 14.30 |
| Mo | 10.90 | 9.90 | — | — |
| Mn | 2.40 | 1.80 | 0.60 | 0.00 |
| Nb | — | — | 3.50 | 2.90 |
| Si | 1.60 | 1.10 | 0.80 | 0.00 |
| W | 6.60 | 5.60 | — | — |
| C | 1.00 | 0.80 | 1.35 | 1.15 |

From the above, it can be seen that Fe is present at a level of 54.0 wt. % to 78.0 wt. %, B is present at a level of 3.0 wt. % to 5.0 wt. %, Cr is present at a level of 14.0 wt. % to 20.0 wt. %, Mo is optional and is present at a level of up to 11.0 wt %, or in the range of 0.1 wt. % to 11.0 wt. %, Mn is optional and is present at a level of up to 2.5 wt. % or in the range of 0.1 wt % to 2.5 wt. %, Nb is optional and is present at a level of up to 4.5 wt. % or at a level of 0.1 wt. % to 4.5 wt. %, Si is optional and is present at a level of up to 2.0 wt. % or at a level of 0.1 wt. % to 2.0 wt. %, W is optional and is present at a level of up to 7.0 wt. % or at a level of 0.1 wt. % to 7.0 wt. % and C is present at a level of 0.5 wt. % to 2.0 wt. %.

In addition, from the above, it can be seen that preferably, the alloy herein contains, within the levels noted above: Fe, B, Cr, Mo, Si, W, and C. The alloy also includes, within the levels noted above, Fe, B, Cr, Nb, and C. In addition it is contemplated herein that the alloys contain, within the levels noted above, Fe, B, Cr, Mo, and C.

Preferably, the alloys for layer-by-layer construction herein are supplied in particle form, meaning that particles are present having a diameter in the range of 5.0 microns to 75.0 microns, more preferably from 15.0 microns to 55.0 microns, and most preferably from 20.0 microns to 45.0 microns.

Table 2 below identifies and compares the conventional Fe based alloys produced via casting and wrought methods with the alloys identified herein with regards to hardness values achieved in Alloy 1 and Alloy 2 via layer-by-layer construction:

TABLE 2

| Alloy | Hardness [HV] |
| --- | --- |
| A36 Mild Steel | 239 |
| 15Cr—3Mo White Iron | 472 |
| Stellite 1 - PTA 1L | 512 |
| 26Cr—Mo—4.5C | 647 |
| 19Cr—5.2C | 705 |
| D2 Tool Steel | 719 |
| 26Cr—Mo—B—4.5C 1L | 745 |
| Ferrous Alloy 1 | 1540 |
| Ferrous Alloy 2 | 1250 |

In the layerwise construction used herein, preferably, an energy source, typically a laser or electron beam, is scanned over a material surface causing at least partial melting of a layer of material local to the area irradiated by the energy source. If desired, the energy source can be tuned to also melt a certain depth of the underlying material. For example, the energy source can be adjusted to melt at a depth in the range up to 250 microns. The molten material metallurgically bonds with the underlying material and solidifies as the energy source moves away. Additional material is added to the solidified material and then irradiated with the energy source to cause melting and solidification. As this process is repeated the thickness of the part being constructed increases. As can be seen from the above, with respect to the examples of Alloy 1 and Alloy 2, the hardness of the solidified layer or plurality of solidified layers formed may more specifically fall in the range of about 1200 HV to 1600 HV.

Relatively high hardness materials typically have a relatively low ductility and relatively low toughness thereby making them susceptible to cracking by thermally induced stresses and historically difficult to process via liquid phase layerwise construction. Hence methods of stress reduction must be employed to mitigate thermally induced stresses and enable crack-free layerwise construction of high hardness materials.

Each time the energy source melts a layer of material the heat is conducted through the built part underneath resulting in expansion upon heating and contraction upon cooling of the underlying material due to the material's inherent thermal expansion properties. Additionally, the molten layer produced during irradiation of a new layer forms metallurgical bonds with the underlying layers and then undergoes contraction upon cooling. The bonds between the new layer and the underlying layers constrain the contraction of the alloy at the interface and thereby induce compressive stresses in the new layer. The material must therefore be capable of withstanding cracking due to the stresses induced during the thermal cycling caused by the cyclic energy source in layerwise construction.

These stresses are reduced by reducing the difference between the temperature of the molten metal, which is typically in the range of 900° C. to 2000° C. for ferrous alloys, and the temperature of the underlying material, which is typically in the range of 25-1400° C. for ferrous alloys. The difference between the temperature of the molten metal and the temperature of the underlying material could be as large as 1950° C. The smaller the difference, the lower the stresses, with the lowest stress case being no difference, and no resulting stresses. Hence heating of the underlying material has a large effect on reduction of the thermal stresses. It is preferred to heat the underlying material to a temperature in the range of 40-1000° C., more preferred in the range of 400-1000° C., and most preferred in the range of 800-1000° C.

Layerwise construction always begins with a substrate off of which a part is built. Once the part construction is completed the part can be removed from the substrate via a variety of techniques including EDM and mechanical sawing. The first layer of material applied to the substrate in constructing a part is an important layer as it serves as the interface from which the part will be built. When the energy source irradiates and at least partially melts the first layer it forms metallurgical bonds with the substrate and upon cooling the first layer contracts. If the substrate and first layer are comprised of different materials with different thermal expansion properties, there exists a significant mismatch in thermal expansion properties. A mismatched thermal expansion will impart stresses at the interface because each material will want to expand and contract at its own rate, however, they are constrained by the other. This results in the development of stresses which can lead to cracking in high hardness materials. Reduction of the difference between the thermal expansion properties of the substrate material and the first layer material largely reduces the stresses induced by a mismatched thermal expansion.

Figure 3:
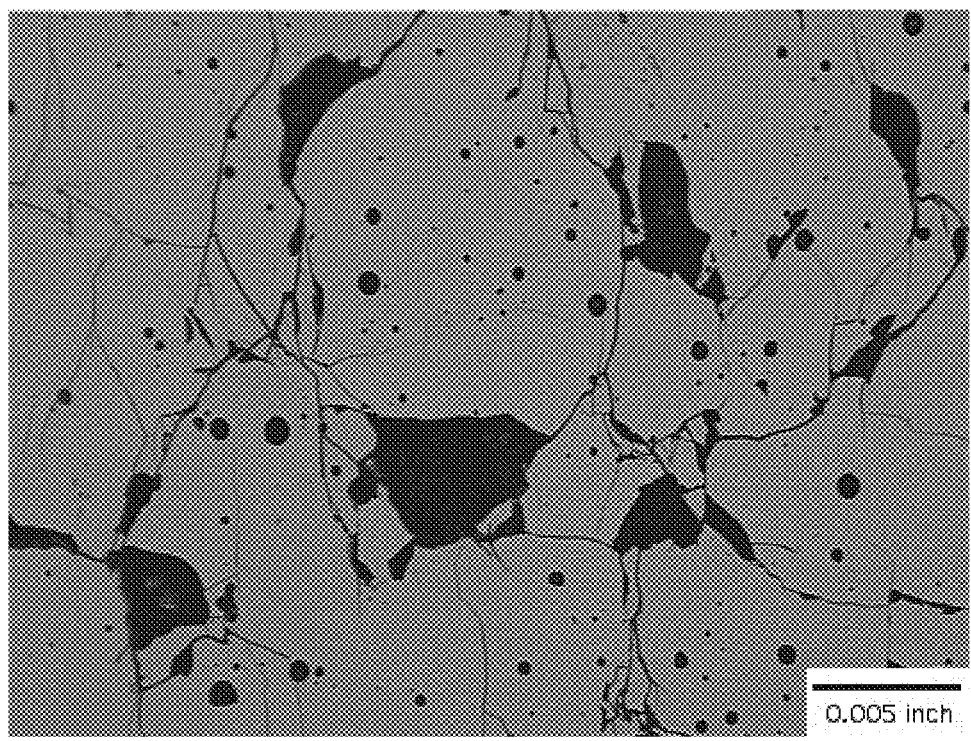
FIG. 3 illustrates a section of a relatively high-hardness ferrous material (hardness of 1250 HV) layerwise constructed with non-optimized parameters.

By combining the utilization of a substrate with the above referenced match of thermal expansion properties to the first layer, and heating of substrate and built layers, the thermally induced stresses can be largely reduced enabling layerwise construction of some materials that are otherwise susceptible to cracking by induced stresses. FIG. 3 shows a section of a high-hardness ferrous material, of hardness 1250 HV layerwise constructed with a substrate temperature of 200° C. and a mismatch in the thermal expansion coefficient between the substrate and first layer of 2 μm/m·° C. The alloy composition was Alloy 2 as noted above. As understood herein, a mismatch in thermal expansion coefficient at or above 2 μm/m·° C. is preferably avoided. Accordingly, the difference in thermal expansion coefficients of the substrate and the applied alloy in the layered construction here is preferably less than 2 μm/m·° C.

Figure 4:
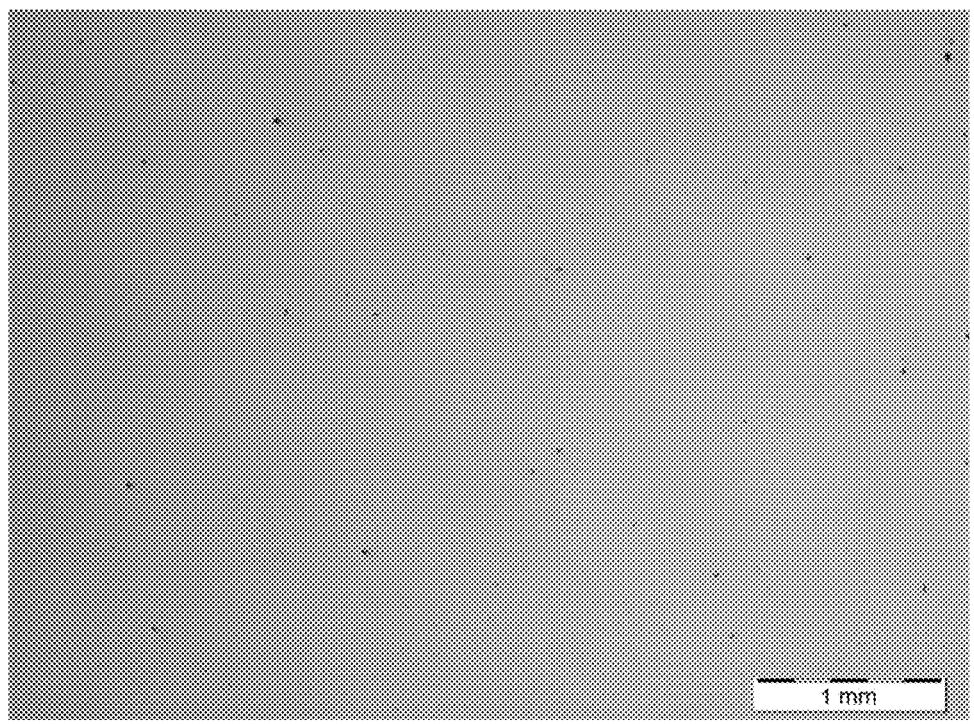
FIG. 4 illustrates a section of a relatively high-hardness ferrous material (hardness of 1250 HV) layerwise constructed with optimized parameters.
Figure 5:
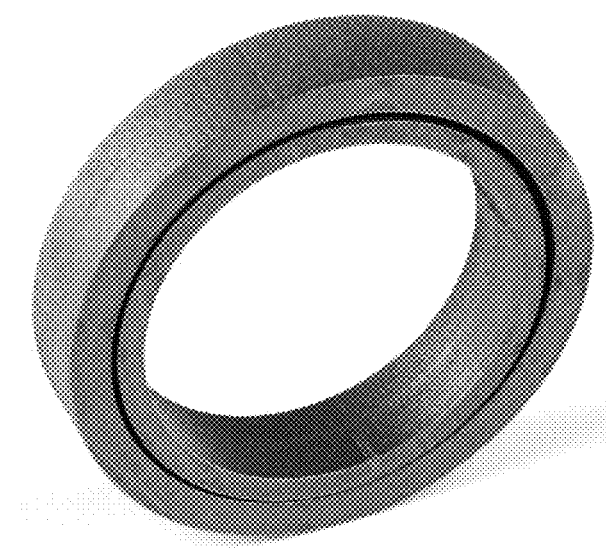
FIG. 5 shows a crack-free, high hardness functional bearing part produced with optimized layerwise construction parameters

FIG. 4 shows a section of the same alloy that was layerwise constructed on an 800° C. heated substrate, which was constructed from the same alloy, such that both the substrate and first layer have a thermal expansion coefficient of 10.4 μm/m·° C., and thereby no mismatch exists. Utilizing substrate heating and controlling the thermal expansion coefficient mismatch between the substrate and first layer to a level of no greater than 2 μm/m·° C., more preferably no greater than 1 μm/m·° C., and most preferably no greater than 0.5 μm/m·° C., one can produce crack free parts, where no cracks are discernible in microscopy with a 50× magnification. FIG. 5 shows a crack-free functional bearing part produced with this technique from Alloy 2 which has a hardness of 1060 HV and a density of 99.9%, where 0.1% of the volume consists of pores and the balance is crack-free solid metal.

It should be appreciated that the layered construction herein is therefore one that provides a metallic part wherein no cracks, pores or other types of voids are discernable in microscopy with a magnification of 50×. In addition the metallic part is such that solid domains are present wherein the one or more layers present define a metallic part that is 95% or more solid. This is reference to the feature that 95% or more of the volume of the part is characterized by the presence of metallic regions with the remainder cracks, pores or other types of open space (collectively identified herein as a void). More preferably, the one or more layers define a metallic part that is 97% solid or greater, and even more preferably, 99% to 100% solid. Accordingly, the one or more layers now provide a layered construction that is 95% or more by volume solid metallic material, as a free-standing part, with a relatively small percentage of voids (less than 5%).

Figure 6:
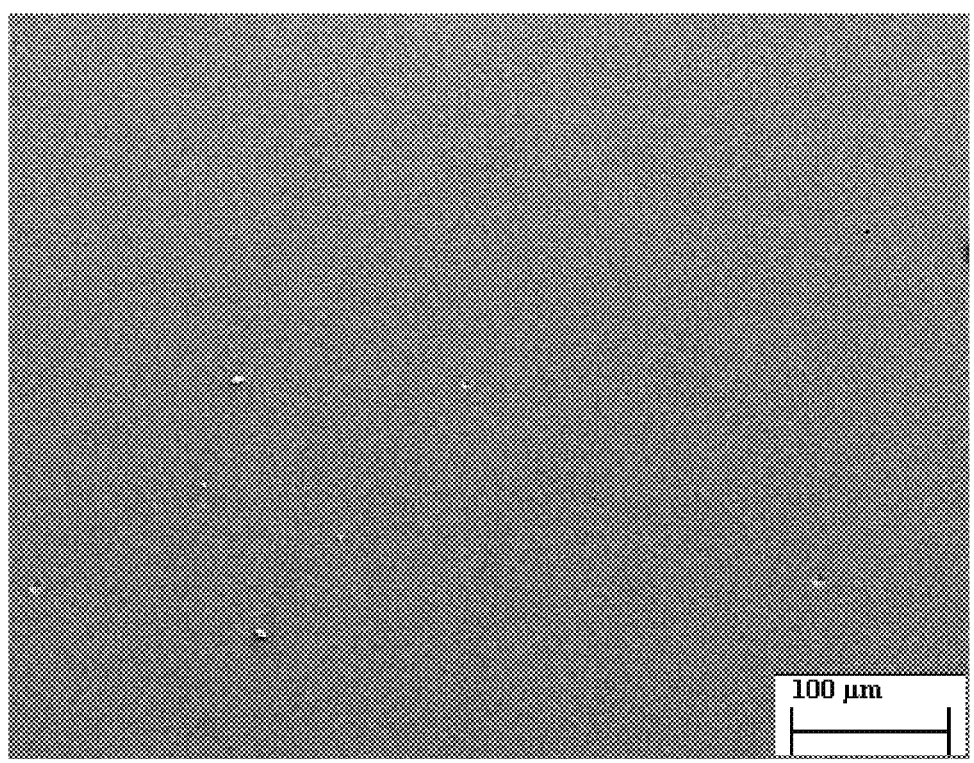
FIG. 6 illustrates a section of a relatively high-hardness (1540 HV) and high wear-resistant and crack-free section of a layerwise constructed high-hardness ferrous metal that is otherwise susceptible to cracking by induced stresses.

FIG. 6 shows a crack-free section of a layerwise constructed high-hardness ferrous metal that is susceptible to cracking by induced stresses. The alloy composition in FIG. 6 was Alloy 1 as noted above. The individual layers had thicknesses of 70 microns and the overall thickness was approximately 10 mm. The material was constructed without cracks by utilizing a 500° C. heated substrate, constructed from UNS S42000, with a coefficient of thermal expansion of 10.3 μm/m·° C., which only has a 0.3 μm/m·° C. mismatch between the substrate and first layer.

While high hardness does not necessarily result in high wear resistance, in most cases it does and as such it is contemplated that the high hardness produced in the ferrous alloys via layerwise construction results in outstanding wear resistance. ASTM G65-10 Procedure A wear tests on Ferrous Alloy 2 shown in the Table 2 measure a volume loss of 24.0 mm³. That being the case, preferably, the layerwise construction herein preferably has a wear resistance of 24.0 mm³ at +/−5.0 mm³.

While preferred embodiments of the present disclosure has been described, it should be understood that various changes, adaptations and modifications can be made therein without departing from the spirit of the disclosure and the scope of the appended claims. The scope of the disclosure should, therefore, be determined not with reference to the above description, but instead should be determined with reference to the appended claims along with their full scope of equivalents.

What is claimed is:

1. A method of layer-by-layer construction of a metallic part comprising:
   supplying particles of an alloy, said alloy consisting of Fe in an amount ranging from 54.0 wt. % to 78.0 wt. %, B in an amount ranging from 3.0 wt. % to 5.0 wt. %, Cr in an amount ranging from 14.0 wt. % to 20.0 wt. %, C in an amount ranging from 0.5 wt. % to 7.0 wt. %, optionally Mo in an amount up to 11.0 wt. %, optionally Mn in an amount up to 2.5 wt. %, optionally Nb in an amount up to 4.5 wt. %, optionally Si in an amount up to 2.0 wt. %, optionally W in an amount up to 7.0 wt. %;
   supplying a substrate;
   applying a first layer of said particles onto said substrate;
   irradiating said first layer of particles with a laser or electron beam to cause at least partial melting of said first layer of particles to form a first molten layer of said alloy;
   cooling said first molten layer to form a first solidified layer of said alloy with an as-formed thickness of 5.0 to 200.0 microns
   applying a second layer of said particles to said first solidified layer;
   irradiating said second layer of particles with a laser or an electron beam to cause at least partial melting of said second layer of particles to form a second molten layer of said alloy;
   cooling said second molten layer to form a second solidified layer of said alloy with an as-formed thickness of 5.0 to 200.0 microns; and removing said substrate by electric-discharge machining or mechanical sawing to form a free-standing metallic part;
wherein:
said first solidified layer, said second solidified layer, or said first and second solidified layers exhibit a hardness in the range of 900-1800 HV; and
said first and second solidified layers contain:
(a) borocarbide and carbide phases at a size of 0.1 microns to 10.0 microns; and
(b) grains with a grain size of 0.1 microns to 10.0 microns.

2. The method of claim 1 wherein said alloy includes said Mo in an amount ranging from 0.1 wt. % to 11.0 wt. %, said Si in an amount ranging from 0.1 wt % to 2.0 wt. %, and said W in an amount ranging from 0.1 wt. % to 7.0 wt. %.

3. The method of claim 1 wherein said alloy includes said Nb in an amount ranging from 0.1 wt. % to 4.5 wt. %.

4. The method of claim 1 wherein said alloy includes said Mo in an amount ranging from 0.1 wt. % to 11.0 wt. %.

5. The method of claim 1 wherein said particles of said alloy comprises particles having a diameter in the range of 5.0 microns to 75.0 microns.

6. The method of claim 1 wherein said substrate has a first thermal expansion coefficient and said metal alloy has a second thermal expansion coefficient, wherein the first thermal expansion coefficient differs from the second thermal expansion coefficient by less than 2 μm/m·° C.

7. The method of claim 1 wherein when the second molten layer is formed, the first solidified layer has a temperature in the range of 25° C. to 1400° C., and the second molten layer has a temperature in the range of 900° C. to 2000° C.

8. The method of claim 1 wherein the first and second solidified layers each have an as-formed thickness in the range of 5.0 microns to 50.0 mm.

9. The method of claim 1 wherein said part has a volume and 95% or more of said volume of said part comprises metallic regions with the remainder voids.

10. The method of claim 1 wherein said part has a volume and 97% or more of said volume of said part comprises metallic regions with the remainder voids.

11. The method of claim 1 wherein said part has a volume and 99% to 100% of said volume of said part comprises metallic regions.

12. The method of claim 1 wherein said first solidified layer, said second solidified layer, or said first and second solidified layers have an ASTM G65-10 Procedure A (2010) wear resistance of 24.0 mm³ at +/−5.0 mm³.

13. The method of claim 1 wherein said metallic part comprises a pump, valve or bearing.

14. A method of layer-by-layer construction of a metallic part comprising:
supplying particles of an alloy, said alloy consisting of Fe in an amount ranging from 54.0 wt. % to 78.0 wt. %, B in an amount ranging from 3.0 wt. % to 5.0 wt. %, Cr in an amount ranging from 14.0 wt. % to 20.0 wt. %, C in an amount ranging from 0.5 wt. % to 7.0 wt. %, optionally Mo in an amount up to 11.0 wt. %, optionally Mn in an amount up to 2.5 wt. %, optionally Nb in an amount up to 4.5 wt. %, optionally Si in an amount up to 2.0 wt. %, optionally W in an amount up to 7.0 wt. %;
supplying a substrate, wherein said substrate has a first thermal expansion coefficient, said alloy has a second thermal expansion coefficient, wherein the first thermal expansion coefficient differs from the second thermal expansion coefficient by less than 2 μm/m·° C.;
applying a first layer of said particles onto said substrate;
irradiating said first layer of particles with a laser or electron beam to cause at least partial melting of said first layer of particles to form a first molten layer of said alloy;
cooling said first molten layer to form a first solidified layer of said alloy with an as-formed thickness of 5.0 to 200.0 microns;
applying a second layer of said particles to said first solidified layer;
irradiating said second layer of particles with a laser or an electron beam to cause at least partial melting of said second layer of particles to form a second molten layer of said alloy;
cooling said second molten layer to form a second solidified layer of said alloy with an as-formed thickness of 5.0 to 200.0 microns; and
optionally removing said substrate to form a free-standing metallic part;
wherein:
said first solidified layer, said second solidified layer, or said first and second solidified layers exhibit a hardness in the range of 900-1800 HV; and
said first and second solidified layers contain:
(a) borocarbide and carbide phases at a size of 0.1 microns to 10.0 microns; and
(b) grains with a grain size of 0.1 microns to 10.0 microns.

15. The method of claim 14, wherein said irradiating is performed with an electron beam.

16. The method of claim 1, wherein said first solidified layer, said second solidified layer, or said first and second solidified layers exhibit a hardness in the range of 1200-1600 HV.

17. The method of claim 14, wherein said first solidified layer, said second solidified layer, or said first and second solidified layers exhibit a hardness in the range of 1200-1600 HV.

* * * * *